(12) United States Patent
Goldstein

(10) Patent No.: US 7,742,642 B2
(45) Date of Patent: Jun. 22, 2010

(54) SYSTEM AND METHOD FOR AUTOMATED READING OF HANDWRITING

(75) Inventor: Ira P. Goldstein, Xenia, OH (US)

(73) Assignee: ExpeData, LLC, Dayton, OH (US)

( * ) Notice: Subject to any disclaimer, the term of this patent is extended or adjusted under 35 U.S.C. 154(b) by 936 days.

(21) Appl. No.: 11/443,302

(22) Filed: May 30, 2006

(65) Prior Publication Data

US 2007/0286486 A1 Dec. 13, 2007

(51) Int. Cl.
G06K 9/72 (2006.01)
G06K 9/18 (2006.01)

(52) U.S. Cl. ....................... 382/229; 382/186

(58) Field of Classification Search ......... 382/155–161, 382/185–231; 707/100, 102, 104.1
See application file for complete search history.

(56) References Cited

U.S. PATENT DOCUMENTS

| | | | |
|---|---|---|---|
| 5,313,527 A | 5/1994 | Guberman et al. | |
| 5,467,407 A * | 11/1995 | Guberman et al. | 382/186 |
| 6,950,555 B2 | 9/2005 | Filatov et al. | |
| 6,952,681 B2 | 10/2005 | McQuade et al. | |
| 6,956,969 B2 | 10/2005 | Loudon et al. | |
| 6,973,215 B1 | 12/2005 | Hullender et al. | |
| 6,985,643 B1 | 1/2006 | Fahraeus et al. | |
| 7,003,158 B1 | 2/2006 | Bennett et al. | |
| 7,010,165 B2 | 3/2006 | Hullender et al. | |
| 7,013,046 B2 | 3/2006 | Kawamura et al. | |
| 7,039,234 B2 | 5/2006 | Geidl et al. | |

FOREIGN PATENT DOCUMENTS

WO   WO 0167378 A1 *  9/2001

OTHER PUBLICATIONS

Lin (Reliable OCR Solution for Digital content Re-mastering, Publishing Systems and Solutions Laboratory-HP Laboratories, Sep. 2001, p. 1-9).*

* cited by examiner

Primary Examiner—Tom Y Lu
Assistant Examiner—Thomas A Conway
(74) Attorney, Agent, or Firm—Dinsmore & Shohl LLP

(57) ABSTRACT

A system for automatically recognizing a handwriting image and converting such image to text data including a sequence of validated words, has an image input device, a number of handwriting recognition engines, and control unit. A first handwriting recognition engine is responsive to the image input device, for analyzing the data file and providing one or more possible text words for each successive word in the data file. The first handwriting recognition engine further provides a resemblance indication for each possible text word indicating a level of resemblance between its appearance and the appearance of the handwritten word in the data file. In the event that there is not a high level of confidence in the selection of the first handwriting recognition engine, a selection of a validated word is based on the selections of one or more of the other handwriting recognition engines.

13 Claims, 1 Drawing Sheet

SYSTEM AND METHOD FOR AUTOMATED READING OF HANDWRITING

CROSS-REFERENCE TO RELATED APPLICATIONS

Not applicable.

STATEMENT REGARDING FEDERALLY SPONSORED RESEARCH OR DEVELOPMENT

Not applicable.

Reference is made to a computer program listing appendix hereto, which is incorporated by reference into the present disclosure. This appendix is submitted on two duplicate compact discs having the following files, with the dates of creation and byte size as indicated.

BACKGROUND OF THE INVENTION

The present invention relates to a system and method for reading handwriting and, more particularly, to a system and method for interpreting handwriting and translating the written image into text.

Computer-aided cursive script recognition and hand printed script recognition have become more commonly used as an increasing number of hardware and software devices have been developed which facilitate and implement inputting data into a computer system through a script interface. For example, tablet computers are designed to permit data, text, and graphics to be inputted by an operator moving a stylus over a touch-responsive screen, simulating writing on the screen. Other types of devices, such as the digital pen shown in U.S. Pat. No. 6,985,643, used in conjunction with a specially encoded paper, permit the pen strokes of the user on the paper to be recorded digitally, and this information then easily supplied to a computer system.

After an image is captured digitally, it still must be "recognized," i.e., converted into a series of text words, images, or other data for use by a computer or other device. Various approaches have been taken in the past to recognize digitized images for this purpose. For example, U.S. Pat. No. 6,950,555, issued Sep. 27, 2005 to Filatov et al, discloses a recognition system in which the anticipated appearance of a word or phrase is compared to a digitized image of a written word. Other types of devices have been used to convert a cursive script image, created with an ordinary writing implement, into a digital format, and then translate the image into digital text so that it can be used by a computer system. Some devices of this sort attempt to recognize each letter of each word individually, while other devices recognize cursive script on a word-by-word basis.

It will be appreciated that translating a handwritten message into a digital text message is a complex task. Variations in the style of handwriting among individuals can be significant. Further, cursive script is commonly written in a relaxed manner, so that some of the cursive letters are ill formed, slurred together, or not formed at all. As a consequence, a word written in cursive script may appear very similar to more than one text word. The text word that is judged to have the highest level of similarity in appearance to the anticipated appearance of a cursive script word will, in many cases, depend upon the specific algorithm used by the computer system to assess this similarity. Such unpredictability will, quite naturally, lead to the mis-recognition of words written in cursive script in a significant number of instances.

It is seen, therefore, that a need exists for an improved system and method for automatically recognizing a handwriting image and converting such image to text data, including a sequence of validated words, in which a significant number of the images are accurately recognized.

SUMMARY OF THE INVENTION

The need is met by a system, according to the present invention, for automatically recognizing a handwriting image and converting the image to text data including a sequence of validated words. The system includes an image input device for inputting as a data file the handwriting image that is to be converted to text data. The system further includes first and second handwriting recognition engines. The first handwriting recognition engine is responsive to the image input device and analyzes the data file to provide one or more possible text words for each successive word in the data file. The first handwriting recognition engine further provides a resemblance indication for each possible text word, indicating a level of resemblance between it and the handwritten word in the data file. The second handwriting recognition engine analyzes words in the data file for which there is not a high level of confidence regarding the analysis performed by the first handwriting recognition engine. The second handwriting recognition engine provides one or more possible text words and a resemblance indication for each possible text word. A control unit chooses as a validated word the text word selected by the first handwriting recognition engine in the event that that text word has a high level of resemblance and a high level of confidence. The control unit selects as a validated word the text word selected by the second handwriting recognition engine in the event that several text words selected by the first handwriting recognition engine have a high level of resemblance, and the text word selected by the second handwriting engine is one of the several text words selected by the first handwriting recognition engine as having a high resemblance indication.

The image input device may comprise a device for monitoring movement of the hand of a user. The first handwriting recognition engine may include a database comprising a plurality of words that may be selected as possible text words. The first and second handwriting recognition engines utilize differing criteria in analyzing the data file. A high level of confidence for a text word selected by a handwriting recognition engine is indicated by a high value resemblance indication for only the single selected text word.

The system may further comprise a preprocessing engine for deleting superfluous data from the data file before analysis of the data file by the first handwriting recognition engine. The control unit may select as a validated word the text word selected by the second handwriting recognition engine having a high resemblance indication in the event that the text words selected by the first handwriting recognition engine have a low level of resemblance.

The system for automatically recognizing a handwriting image and converting such image to text data including a sequence of validated words may include an image input device for inputting as a data file the handwriting image that is to be converted to text data, a first handwriting recognition engine, and a plurality of handwriting recognition engines. The first handwriting recognition engine is responsive to the image input device, analyzes the data file, and provides one or more possible text words for each successive word in the data file. The first handwriting recognition engine further provides a resemblance indication for each possible text word indicating a level of resemblance between it and the handwritten word in the data file. The plurality of additional handwriting recognition engines analyze words in the data file for which there is not a high level of confidence regarding the analysis performed by the first handwriting recognition engine. Each of the plurality of additional handwriting recognition engines provides one or more possible text words and a resemblance indication for each possible text word. A control unit selects, as a validated word, the text word chosen by the first handwriting recognition engine in the event that that text word has a high level of resemblance and a high level of confidence. In the event that several text words selected by the first handwriting recognition engine have a high level of resemblance, the control unit selects as a validated word the text word selected by the plurality of additional handwriting recognition engines as having the highest level of resemblance, provided that that text word is also one of the several text words selected by the first handwriting recognition engine as having a high resemblance indication.

The image input device may comprise a device for monitoring movement of the hand of a user. The first handwriting recognition engine may include a database comprising a plurality of words that can be selected as possible text words. The first and the additional handwriting recognition engines utilize differing criteria in analyzing the data file. A high level of confidence for a text word selected by a handwriting recognition engine may be indicated by a high value resemblance indication for only the single selected text word. A preprocessing engine deletes superfluous data from the data file before analysis of the data file by the first handwriting recognition engine. The control unit selects as a validated word the text word selected by the additional handwriting recognition engines having a high resemblance indication in the event that the text words selected by the first handwriting recognition engine have a low level of resemblance.

The invention includes a method of automatically recognizing a handwriting image and converting such image to text data including a sequence of validated words. The method includes the steps of inputting a data file of a handwriting image that is to be converted to text data, analyzing the data file utilizing a first handwriting recognition engine, and providing one or more possible text words for each successive word in the data file. A resemblance indication for each of the possible text words indicates a level of resemblance between it and the handwritten word in the data file. The method further contemplates analyzing words in the data file utilizing a second handwriting recognition engine, where there is not a high level of confidence regarding the analysis performed by the first handwriting recognition engine. The second handwriting recognition engine provides one or more possible text words and a resemblance indication indicating a level of resemblance between the one or more possible text words and the handwritten word in the data file. The method further includes the steps of selecting as a validated word the text word selected by the first handwriting recognition engine in the event that that text word has a high level of resemblance and a high level of confidence, and selecting as a validated word the text word selected by the second handwriting recognition engine in the event that several text words selected by the first handwriting recognition engine have a high level of resemblance, and the text word selected by the second handwriting engine is one of the several text words selected by the first handwriting recognition engine as having a high resemblance.

The step of inputting a data file of a handwriting image that is to be converted to text data may include the step of monitoring movement of the hand of a user. The method may further include the step of preprocessing the data file before analysis of the data file by the first handwriting recognition engine to delete superfluous data from the data file. The first and second handwriting recognition engines may utilize differing criteria in analyzing the data file. The control unit selects as a validated word the text word selected by the second handwriting recognition engine having a high resemblance indication in the event that the text words selected by the first handwriting recognition engine have a low level of resemblance. Finally, the method contemplates providing a database comprising a plurality of words, which may be selected as possible text words.

A system for automatically recognizing a handwriting image and converting such image to text data, including a sequence of validated words comprises one or more handwriting recognition engines, and a control unit. The control unit controls operation of the one or more handwriting recognition engines. The control unit also removes noise, identifies cross outs, removes overwrites and normalizes the sequence of strokes made in producing the handwriting image.

A system is provided for automatically recognizing handwriting images on a form having a plurality of fields and field areas associated with the fields. Each field has an associated data type. The images are converted to text data, including a sequence of validated words. The system includes an image input device for inputting as a data file the handwriting image that is to be converted to text data. The handwriting image consists of a plurality of images with each image associated with a respective one of the plurality of fields on the form. The system includes one or more handwriting recognition engines, responsive to the image input device, for analyzing the data file, comparing words in the data file to text words in a data type lexicon, and providing a text word for each successive word in the data file based on the comparisons. A control unit controls operation of the one or more handwriting recognition engines. The control unit selects the lexicon to be used in respect to each of the images based on the data type of the field in which the image appears. The control unit selects as a validated word the text word selected by the one or more handwriting recognition engines.

The control unit may determine the portion of the images associated with each field. The control unit associates images with fields even if the images are not within one of the field areas on the form.

Accordingly, it is an object of the present invention to provide a system for automatically recognizing a handwriting image, and converting such image to text data including a sequence of validated words.

BRIEF DESCRIPTION OF THE DRAWINGS

The figure is a block diagram illustrating the system and method of the present invention.

DETAILED DESCRIPTION OF THE PREFERRED EMBODIMENT

Figure 1:
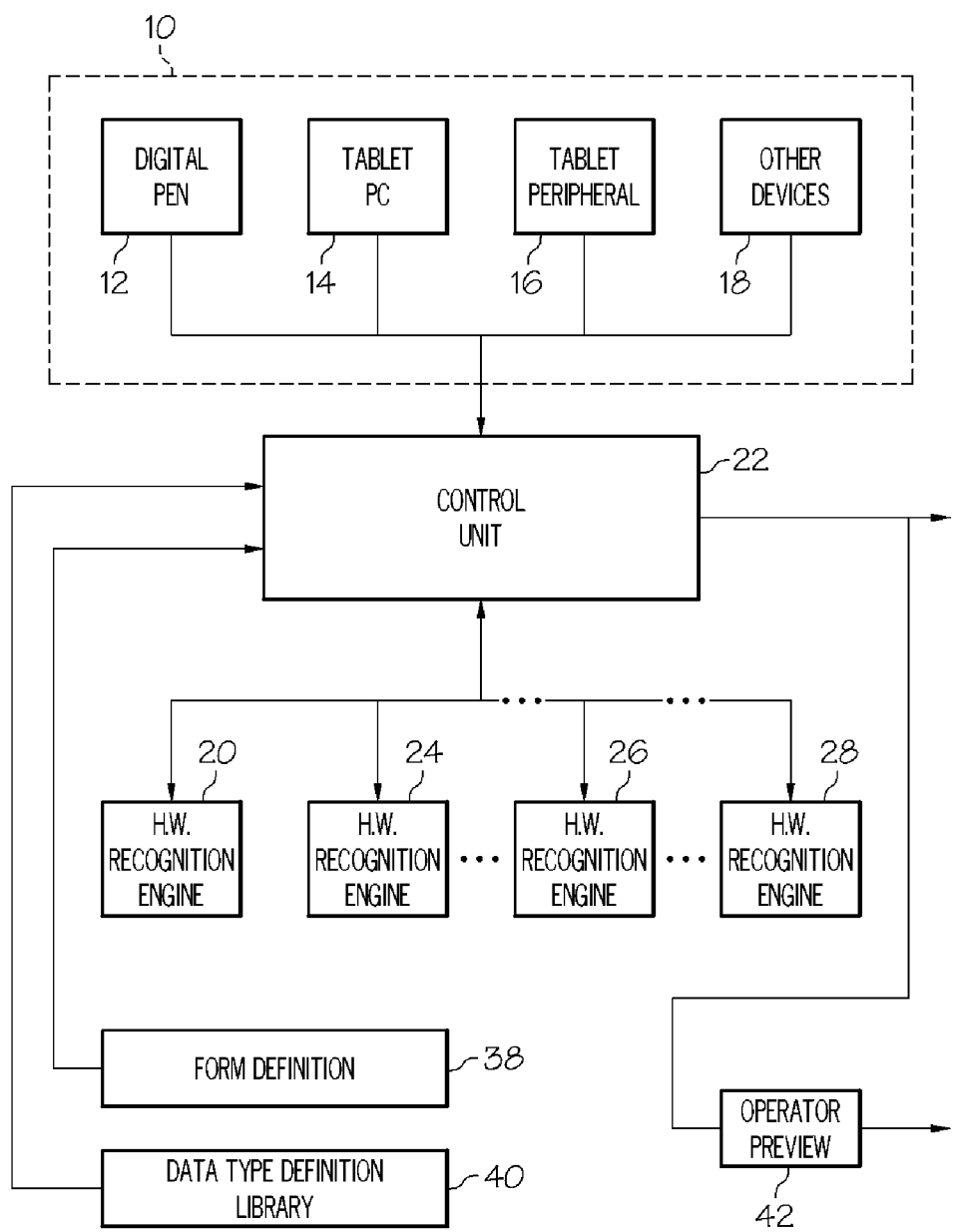

The present invention provides an improved system for recognizing a handwriting image and converting the image to text data including a sequence of validated words. In this context, "validated" is intended to refer to the words that are chosen by the system as the most likely to correspond accurately to the written words. As seen in the drawing FIGURE, the system includes an image input device 10 for inputting as a data file the handwriting image that is to be converted to text data. The input device 10 may include a digital pen 12, a tablet PC 14, a tablet peripheral device 16, and other devices 18, for example, or any single one or combination of such devices that are capable of accepting a handwriting image in some form and converting it to digital form in a data file. The digital pen 12 may be a device for monitoring movement of the hand of a user, such as for example a digital pen of the type available from Logitech used in conjunction with a pattern bearing "digital paper." The pen senses its motion over the paper surface and then transfers information regarding the shape and position of the pen strokes when it is docked in a suitable docking station. The tablet PC 14 and the tablet peripheral 16 typically include a stylus that is used to "write" on a screen that senses the position and movement of the stylus. Other devices 18 can include a variety of devices such as scanner arrangements that scan a handwriting image previously written on conventional paper with a conventional writing implement.

The system includes a first handwriting recognition engine 20 that is responsive to the image input device 10 through control unit 22. Engine 20 analyzes the data file and provides one or more possible text words for each successive word in said data file. The first handwriting recognition engine 20 provides a resemblance indication to control unit 22 for each possible text word, indicating a level of resemblance between it and the handwritten word in the data file. If there is a high level of confidence for a text word selected by the handwriting recognition engine 20, as indicated by a high value resemblance indication for only a single selected text word, then the conclusion of the system is that the selected text word corresponds to the written word and the conversion process for this word is completed.

The situation is not so straightforward, however, if several possible text words have a high value resemblance indication. To deal with this, in one embodiment of the invention, the system includes a second handwriting recognition engine 24 to which the data file is also provided by control unit 22. The second handwriting recognition engine 24 analyzes words in the data file received from the image input device 10 where there is not a high level of confidence regarding the analysis performed by the first handwriting recognition engine 20. The second handwriting recognition engine provides one or more possible text words and a resemblance indication for each such possible text word.

The control unit 22 chooses as a validated word the text word selected by the first handwriting recognition engine 20 without using the second handwriting engine 24 in those instances in which that text word has a high level of resemblance and a high level of confidence. However, the control unit 22 selects as a validated word the text word selected by the second handwriting recognition engine 24 in the event that several text words selected by the first handwriting recognition engine 20 have a high level of resemblance and a low level of confidence, and the text word selected by the second handwriting engine 24 is one of the several text words selected by the first handwriting recognition engine 20 as having a high resemblance indication.

As an example, assume that the first recognition engine 20 determines that the text word "ran" has a resemblance indication of 0.7 (on a 1-to-0 scale, with 1 being the highest resemblance indication) and the text word "run" has a resemblance indication of 0.68 with respect to a word in the data file. The word being analyzed obviously looks like both "run" and "ran" to the handwriting recognition engine 20, with a very low level of confidence of the choice of "run" over "ran," since the resemblance indications are nearly equal. The control unit 22 in this instance then submits the data file to handwriting recognition engine 24. Recognition engine 24 uses a recognition algorithm that differs from that of first handwriting recognition engine 20. Alternatively, the second handwriting engine 24 may use the same algorithm but different criteria in analyzing the data file. The second handwriting recognition engine 24 analyzes the word in the data file and provides the text word "run" with a resemblance indication of 0.3 and the text word "ran" with a resemblance indication of 0.6. Based on the clear choice of the engine 24 of "ran" over "run", the control unit 22 then interprets the word as "ran," and validates this choice.

The first handwriting recognition engine 20 and the second handwriting engine 24 may each include a database comprising a plurality of words that can be selected as possible text words. One or more such word databases may be included in the control unit 22.

It will be appreciated that there may be instances where the handwriting image in the data file includes a significant amount of extraneous information. This can occur, for example, in those instances where the user or someone else inadvertently made small, extraneous marks which signify nothing. To deal with such a situation, the control unit 22 may include a preprocessing engine for deleting superfluous data from the data file before analysis of the data file by the first handwriting recognition engine 20. The preprocessing engine may remove noise (such as extraneous data attributable to random markings), identify cross outs (and ignore the crossed out information), remove overwrites, and normalize the sequence of strokes made in producing the handwriting image (i.e., present an accurate depiction of the image without information about the order in which the strokes constituting the written image were made).

Occasionally, in analyzing a written word the first handwriting recognition engine 20 may select text words that all have a low level of resemblance. In such an instance, the control unit 22 selects as a validated word the text word chosen by the second handwriting recognition engine 24 having the highest resemblance indication, regardless of whether that text word was among those selected by the first handwriting recognition engine 20.

Rather than having only a first handwriting recognition engine 20 and a second handwriting recognition engine 24, the system may also have additional handwriting recognition engines as indicated at 26 and 28. In such an embodiment, the plurality of handwriting recognition engines 24, 26 and 28 all analyze words in the data file for which there is not a high level of confidence regarding the analysis performed by the first handwriting recognition engine 20. Each of the plurality of additional handwriting recognition engines 24, 26, and 28 provides one or more possible text words and a resemblance indication for each such possible text word. The plurality of additional handwriting recognition engines 24, 26, and 28 each utilizes an algorithm or criteria that differ from the other handwriting recognition engines.

The control unit 22 selects as a validated word the text word selected by the first handwriting recognition engine 20 in the event that that text word has a high level of resemblance and a high level of confidence. In the event that several text words selected by the first handwriting recognition engine 20 have a high level of resemblance, the control unit 22 selects as a validated word the text word selected by the plurality of additional handwriting recognition engines 24, 26, and 28 as having the highest level of resemblance, provided that the text word selected by the plurality of engines 24, 26, and 28 is one of the several text words selected by the first handwriting recognition engine 20 as having a high resemblance indication.

It will be appreciated that the present invention contemplates a method of automatically recognizing a handwritten image and converting such an image to text data including a sequence of validated words. A data file of a handwriting image that is to be converted is analyzed utilizing a first handwriting recognition engine. One or more possible text words for each successive word in the data file are provided, along with a resemblance indication for each of the possible text words indicating a level of resemblance between it and the handwritten word in the data file. In the event that that text word selected by the first handwriting recognition engine has a high level of resemblance and a high level of confidence, it is selected as a validated word.

When there is not a high level of confidence regarding the analysis performed by the first handwriting recognition engine, the data file may be analyzed utilizing a second handwriting recognition engine. The second handwriting recognition engine provides one or more possible text words and a resemblance indication indicating a level of resemblance between each such possible text word and the handwritten word in the data file. A validated word is selected by the second handwriting recognition engine in the event that several text words selected by the first handwriting recognition engine have a high level of resemblance, and the text word selected by the second handwriting engine is one of the several text words selected by the first handwriting recognition engine as having a high resemblance. The control unit may simply select as a validated word the text word selected by the second handwriting recognition engine having a high resemblance indication in the event that none of the text words selected by the first handwriting recognition engine has a high level of resemblance.

The step of inputting a data file of a handwriting image that is to be converted to text data may include the step of monitoring movement of the hand of a user. The method may further include the step of preprocessing the data file before analysis of the data file by the first handwriting recognition engine to delete superfluous data from the data file. The first and second handwriting recognition engines utilize differing criteria in analyzing the data file.

As indicated previously a plurality of handwriting recognition engines may be used in the present invention to enhance the accuracy of the system. These engines may include commercially available engines, such as those available from Vision Objects of San Francisco, Calif., Microsoft Corporation Windows XP Tablet Edition software, Evernote Corporation of Sunnyvale, Calif., and other known handwriting recognition software programs. Additionally, a human operator may also perform the role of a handwriting recognition engine. Except for the instances of a human operator acting as a handwriting recognition engine, the recognition engines and the control unit are preferably implemented as software modules operating on a computer.

In a further variation of the embodiment of the present invention, shown in the FIGURE, the system provides an arrangement for automatically recognizing handwriting images written on a form having a plurality of fields and field areas associated with the fields. Each field has an associated data type. As discussed previously, the system includes an image input device 10 for inputting as a data file the handwriting image that is to be converted to text data. The handwriting image consists of a plurality of images with each image associated with a respective one of a plurality of fields on the form being read. A form definition library 38 keeps track of the data type associated with each field on the form. One or more handwriting recognition engines 20 through 28 are responsive to the image input device, and act to analyze the data file, comparing words in the data file to text words in a data type lexicon 40, based on the data type specified in the associated form definition. For example, if a particular field will have only the names of U.S. states, then only the names of states will appear in the selected lexicon, resulting in the most likely state name being chosen. If, on the other hand, a field will have only numeric characters, only such characters will appear in the lexicon used in conjunction with this field. A text word is provided for each successive word in each field in the data file based on these comparisons. If desired, the fields may be broken down by "combs" which are vertical lines that separate the fields into boxes. Combs are commonly used where the person completing the form is asked to print in the data field, and they tend to restrict the placement of individual characters, making the identification of those characters somewhat easier. If desired, the control unit 22 may first attempt recognition of the written words using the combs as a limiting criteria (i.e., assuming that the form has been completed with a single character written in each box). If it is not possible to recognize a handwritten word on this basis, the control unit 22 may effectively remove the comb limitation and attempt recognition based on an assessment of the written image without this limitation.

If desired, a human operator, as indicated at 42, may check the validated words that have been chosen by the system. This may take the form of the validated characters being presented to a display, along with the original image from the data file, to permit the operator to override the word choice of the system by substituting the operator's own judgment. If desired, the control unit may operate with lexicons being either prescriptive or non-prescriptive. A prescriptive lexicon requires that the selected, validated word is chosen from those in the lexicon, whereas a non-prescriptive lexicon looks first to the words in the lexicon and then, if an appropriate match is not found, broadens the search to words not in the lexicon.

It will be appreciated that the control unit 22 may, if desired, change the handwriting recognition engine that performs the role of the "first" handwriting recognition engine in dependence upon the data type of the field from which the handwriting image is taken. For example, one handwriting recognition engine may be found to be preferable to others in regard to recognizing written alpha characters, another handwriting recognition engine may be found to be preferable to others in regard to numeric characters, and another handwriting recognition engine may be best for recognizing graphic images. The choice of the "first" handwriting recognition engine may differ in each instance.

Other aspects, objects, and advantages of the present invention can be obtained from a study of the drawings, the disclosure, and the appended claims.

What is claimed is:

1. A computer system for automatically recognizing a handwriting image and converting such image to text data including a sequence of validated words, comprising:
   an image input device for inputting as a data file the handwriting image that is to be converted to text data, and
   a computer, implementing under software control,
      a first handwriting recognition engine, responsive to said image input device, for analyzing said data file and providing one or more possible text words for each successive word in said data file, said first handwriting recognition engine further providing a resemblance indication for each possible text word indicating a level of resemblance between it and the handwritten word in the data file,
      a second handwriting recognition engine for analyzing words in said data file for which there is not a high level of confidence regarding the analysis performed by the first handwriting recognition engine, said second handwriting recognition engine providing one or more possible text words and a resemblance indication for each possible text word, and a control unit for selecting as a validated word the text word having the highest resemblance indication provided by the first handwriting recognition engine in the event that that text word has a high level of resemblance and a high level of confidence, and for selecting as a validated word the text word having the highest resemblance indication provided by the second handwriting recognition engine in the event that several text words have a high level of resemblance indication provided by the first handwriting recognition engine, and the text word having the highest resemblance indication provided by the second handwriting recognition engine is one of the several text words having a high level of resemblance indication provided by the first handwriting recognition engine.

2. The computer system according to claim 1 for automatically recognizing a handwriting image and converting such image to text data including a sequence of validated words, in which said image input device comprises a device for monitoring movement of the hand of a user.

3. The computer system according to claim 1 for automatically recognizing a handwriting image and converting such image to text data including a sequence of validated words, in which said first handwriting recognition engine includes a database comprising a plurality of words which may be selected as possible text words.

4. The computer system according to claim 1 for automatically recognizing a handwriting image and converting such image to text data including a sequence of validated words, in which said first and second handwriting recognition engines utilize differing criteria in analyzing said data file.

5. The computer system according to claim 1 for automatically recognizing a handwriting image and converting such image to text data including a sequence of validated words, in which a high level of confidence for a text word is indicated by a high value resemblance indication provided by a handwriting recognition engine for only the single selected text word.

6. The computer system according to claim 1 for automatically recognizing a handwriting image and converting such image to text data including a sequence of validated words, further comprising a preprocessing engine for deleting superfluous data from said data file before analysis of said data file by said first handwriting recognition engine.

7. The computer system according to claim 1 for automatically recognizing a handwriting image and converting such image to text data including a sequence of validated words, in which said control unit selects as a validated word the text word provided with a high resemblance indication by the second handwriting recognition engine in the event that the text words are provided with a low level of resemblance by the first handwriting recognition engine.

8. A method of automatically recognizing a handwriting image and converting such image to text data including a sequence of validated words, comprising the steps of:

inputting a data file of a handwriting image that is to be converted to text data into a computer, analyzing said data file utilizing a first computer implemented handwriting recognition engine, and providing one or more possible text words for each successive word in said data file, and a resemblance indication for each of said possible text words indicating a level of resemblance between it and the handwritten word in the data file, analyzing words in said data file utilizing a second computer implemented handwriting recognition engine, where there is not a high level of confidence regarding the analysis performed by the first handwriting recognition engine, said second handwriting recognition engine providing one or more possible text words and a resemblance indication indicating a level of resemblance between it and the handwritten word in the data file, and using a computer, selecting as a validated word the text word having the highest resemblance indication provided by the first handwriting recognition engine in the event that that text word has a high level of resemblance and a high level of confidence, and using a computer, selecting as a validated word the text word having the highest resemblance indication provided by the second handwriting recognition engine in the event that several text words have a high level of resemblance indication provided by the first handwriting recognition engine, and the text word having the highest resemblance indication provided by the second handwriting recognition engine is one of the several text words having a high level of resemblance indication provided by the first handwriting recognition engine.

9. The method of automatically recognizing a handwriting image and converting such image to text data including a sequence of validated words according to claim 8, in which the step of inputting a data file of a handwriting image that is to be converted to text data includes the step of monitoring movement of the hand of a user.

10. The method of automatically recognizing a handwriting image and converting such image to text data including a sequence of validated words according to claim 8, further includes the step of preprocessing said data file in a computer before analysis of said data file by said first handwriting recognition engine to delete superfluous data from said data file.

11. The method of automatically recognizing a handwriting image and converting such image to text data including a sequence of validated words according to claim 8, in which said first and second handwriting recognition engines utilize differing criteria in analyzing said data file.

12. The method of automatically recognizing a handwriting image and converting such image to text data including a sequence of validated words according to claim 8, further comprising the step of, using a computer, selecting as a validated word the text word having the highest level of resemblance indication provided by the second handwriting recognition engine in the event that the text words are provided with a low level of resemblance by the first handwriting recognition engine.

13. The method of automatically recognizing a handwriting image and converting such image to text data including a sequence of validated words according to claim 8, further comprising the step of providing a database comprising a plurality of words which may be selected as possible text words.

* * * * *